(12) United States Patent
Schweitzer et al.

(10) Patent No.: US 10,849,286 B2
(45) Date of Patent: Dec. 1, 2020

(54) IRRIGATION SYSTEM AND METHOD HAVING CONTROL HEADS OUTSIDE OF A MATRIX OF IRRIGATION ZONES

(71) Applicant: Netafim, Ltd., Tel Aviv (IL)

(72) Inventors: Abraham Schweitzer, Kibbutz Hatzerim (IL); Esteban Socolsky, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 60 days.

(21) Appl. No.: 15/562,997

(22) PCT Filed: Mar. 23, 2016

(86) PCT No.: PCT/IB2016/051661
§ 371 (c)(1),
(2) Date: Sep. 29, 2017

(87) PCT Pub. No.: WO2016/157038
PCT Pub. Date: Oct. 6, 2016

(65) Prior Publication Data
US 2018/0359963 A1    Dec. 20, 2018

Related U.S. Application Data

(60) Provisional application No. 62/139,806, filed on Mar. 30, 2015.

(51) Int. Cl.
| | | |
|---|---|---|
| *A01G 25/16* | (2006.01) | |
| *A01G 25/02* | (2006.01) | |
| *A01C 23/04* | (2006.01) | |
| *A01M 7/00* | (2006.01) | |

(52) U.S. Cl.
CPC .......... *A01G 25/165* (2013.01); *A01C 23/042* (2013.01); *A01G 25/02* (2013.01); *A01G 25/16* (2013.01); *A01M 7/0032* (2013.01); *A01G 25/023* (2013.01)

(58) Field of Classification Search
CPC .... A01G 25/165; A01G 25/06; A01G 25/023; A01G 25/02; A01C 23/042
See application file for complete search history.

(56) References Cited

U.S. PATENT DOCUMENTS

| | | |
|---|---|---|
| 4,646,224 A | 2/1987 | Ransburg et al. |
| 4,852,802 A | 8/1989 | Iggulden et al. |
| 2002/0183935 A1 | 12/2002 | Skinner |
| 2006/0027676 A1 | 2/2006 | Buck et al. |

(Continued)

OTHER PUBLICATIONS

International Search Report dated Jul. 29, 2016, in counterpart International (PCT) Application No. PCT/IB2016/051661.

(Continued)

*Primary Examiner* — Sean D Andrish
(74) *Attorney, Agent, or Firm* — Womble Bond Dickinson (US) LLP

(57) ABSTRACT

An irrigation system is provided for irrigating a field divided into irrigation zones. The irrigation zones are arranged in columns extending alongside each other. The system has irrigation strips and a control head at an upstream end of each irrigation strip. Each irrigation strip provides irrigation substances to a column of zones. All control heads are located alongside a boundary of the field outside of the irrigation zones.

26 Claims, 6 Drawing Sheets

(56) References Cited

U.S. PATENT DOCUMENTS

| | | | |
|---|---|---|---|
| 2008/0142614 A1 | 6/2008 | Elezaby | |
| 2009/0145985 A1* | 6/2009 | Mayer | A01G 27/005 239/542 |
| 2012/0084115 A1 | 4/2012 | Cline et al. | |
| 2013/0220437 A1* | 8/2013 | Dean, Jr. | A01G 25/16 137/15.04 |
| 2014/0252103 A1* | 9/2014 | Hamann | B05B 12/04 239/1 |
| 2014/0312134 A1 | 10/2014 | DeFrank et al. | |

OTHER PUBLICATIONS

Written Opinion dated Jul. 29, 2016, in counterpart International (PCT) Application No. PCT/IB2016/051661.

\* cited by examiner

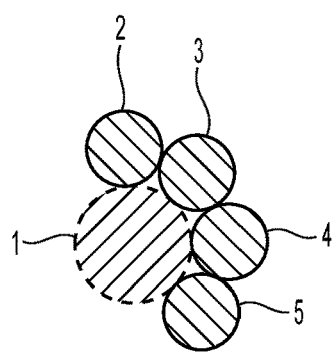
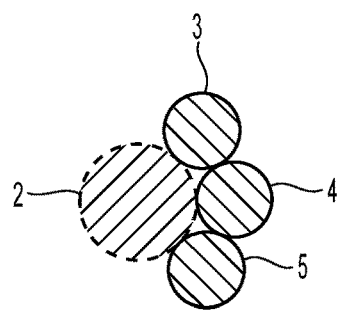
Fig. 5
Fig. 6
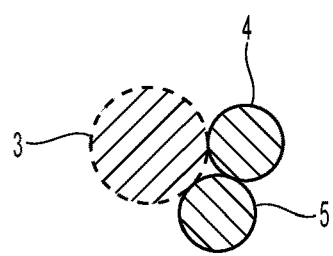
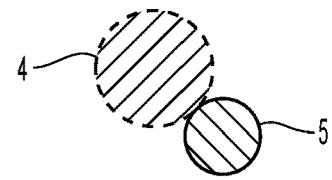
Fig. 7
Fig. 8
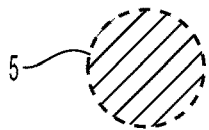
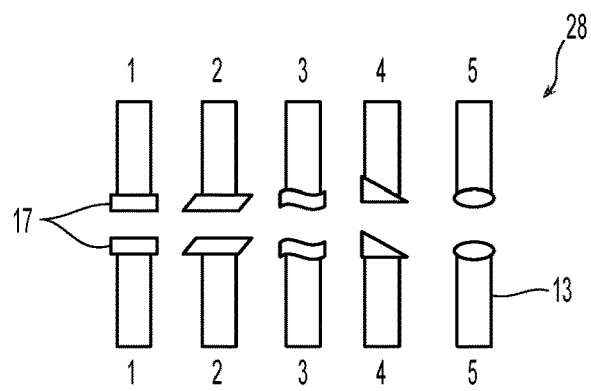
Fig. 9
Fig. 10

IRRIGATION SYSTEM AND METHOD HAVING CONTROL HEADS OUTSIDE OF A MATRIX OF IRRIGATION ZONES

RELATED APPLICATIONS

This is a 35 USC 371 U.S. National Phase of International Application No. PCT/IB2016/051661 filed 23 Mar. 2016 and published in English as WO 2016/157038A1 on 6 Oct. 2016, which claims priority to U.S. Provisional application No. 62/139,806, filed 30 Mar. 2015. The contents of the aforementioned applications are incorporated by reference in their entirety.

TECHNICAL FIELD

Embodiments of the invention relate to an irrigation system and method, in particular for use in precision agriculture.

BACKGROUND

Precision agriculture involves obtaining large amounts of data relating to condition of a crop at a high spatial resolution, in order to address variability of e.g. agricultural land and crop. This agricultural approach includes utilizing technologies such as global positioning systems (GPS), Geographical Information Systems (GIS), yield monitoring and technologies for remote and/or proximal sensing.

Technologies for monitoring or sensing crops may utilize airborne sensors mounted on crafts, such as: satellites, airplanes, unmanned aerial vehicles (drones), hot-air balloons (and the like). Ground sensors may also be used, such as a vehicle mounted sensors (e.g. on tractors) for monitoring crops from a proximal distance; or on poles, masts or towers for monitoring crops in a field from above. Proximal sensing may include also a mesh of local fixed sensors.

Sensors commonly used for precise agriculture can be hyper and multi spectral cameras, such as the type manufactured by TETRACAM Inc. that may capture few bands in the spectrum of 400 nm-10 μm. Other sensing methods may make use of thermal cameras to evaluate water status in plants by temperature reading of the canopy. FLIR Systems Inc. is known to offer wide range of thermal cameras that can be mounted on aircrafts or poles and also light weight mini thermal cameras that can be mounted on drones.

Spatial information gathered from sensors may be used to determine the spatial variability of vegetation or plant water content in the field. This information may be used to derive indexes indicative of crop or vegetation condition. Such indexes may include stress indexes such as Crop Water Stress Index (CWSI) derived from sensors obtaining temperature measurements of crops. Other indexes may include soil and vegetation indexes, such as Normalized Difference Vegetative Index (NDVI) derived from high spectral imagery and based on optical reflectivity of plants. Using such indexes may assist in determining an irrigation recommendation and scheduling.

Crop growth can be affected by the administration via irrigation of various irrigation substances such as water, fertilizers, fungicides, herbicides, and pesticides (and the like). At least some of said substances such as fungicides, herbicides, pesticides may be collectively called crop protection products. By accurately monitoring a crop it can be possible to arrive at the quantity, location and timing of e.g. irrigation of fertilizing a field in order to reduce crop variability, increase yield and reduce inputs costs. A field may be divided into zones according to e.g. a required irrigation resolution.

A minimal area in a field monitored by an imaging device may be defined by the pixel resolution of the imaging device, while the actual zone size by crop spatial variability characteristics. Such minimal area may be the coverage area that each pixel in such sensor monitors in a field or sub-pixel area within the pixel coverage. Therefore, a zone derived from technology utilizing an imaging device, may range in size from the area that each pixel (or sub-pixel) covers in a field to a cluster of one or more of such areas. In fields monitored by e.g. technologies utilizing vehicle mounted sensors, a minimal size of zone may be more flexibly defined.

Pixels, for example in a satellite image, may cover areas in the range of resolution of about 1 square meter to about 100 square meters in a field at ground level. Consequently, using such data can derive an irrigation recommendation, plan and/or regime tailored to distinct zones in a field. Attempts have been made to derive irrigation scheduling on the basis of remote or proximal sensed crops.

Bellvert et al, in an article entitled "scheduling vineyard irrigation based on mapping leaf water potential from airborne thermal imagery", Precision agriculture 13 (2013); describe using an irrigation system divided into sectors and then taking individual irrigation decisions for each sector based on sensed information.

Sanchez et al, in an article entitled "effect of a variable rate irrigation strategy on the variability of crop production in wine grapes in California", ISPA $12^{th}$ conference; describe an irrigation system including water valves, flow meters, power and electronics components as well as a central computer, antenna and wireless modem for remote access and control of the system. Hoses are used in the system fastened to wires running back and forth along the vine row.

An irrigation system, however, suitable for providing such tailored irrigation, may be complex in design. It may require e.g. a large amount of irrigation pipes for firstly providing irrigation to each zone and then a large amount of valves and controllers for being able to individually irrigate each zone. Therefore, there is a need to simplify the design and control of irrigation systems suitable for precision agriculture.

SUMMARY

The following embodiments and aspects thereof are described and illustrated in conjunction with systems, tools and methods which are meant to be exemplary and illustrative, not limiting in scope.

In an embodiment there is provided an irrigation system for irrigating a field divided into zones, the zones being arranged in columns extending alongside each other and defining field strips, and the system comprising irrigation strips and a control head at an upstream end of each irrigation strip, each irrigation strip providing irrigation substances to a respective field strip and each control head controlling downstream flow towards its irrigation strip, wherein at least some of the zones define a matrix comprising rows and columns of zones, and all control heads are located alongside a row at a boundary of the matrix.

In an aspect of the invention, location of all control heads alongside the boundary may simplify assembly and/or maintenance of the system by placing infrastructure that typically requires access during a life time of the system at a boundary where an access route over non-cultivated land can be provided.

In an embodiment, the system can be configured so that it can provide to each zone irrigation substances in an independent manner in relation to other zones of the field. By this e.g. specific irrigation recommendations and scheduling's can be provided to meet more precise needs of a certain zone that may be different from other zones due to e.g. different soil etc.

In an embodiment, the independent manner comprises irrigating different zones for different durations of time during an irrigation cycle when irrigation substances can be provided via the system to the field.

A main distribution pipe may be provided in an irrigation system according to embodiment(s) of the invention for feeding the control heads and irrigation strips with downstream flow of irrigation substances. In an embodiment, by providing e.g. a downstream flow of concentrated substance(s) via the main distribution pipe, it may be possible to independently provide substances such as fertilizers, fungicides, herbicides and/or pesticides to each zone by e.g. configuring different durations of time that each zone is provided with the substances from the main distribution pipe during an irrigation cycle.

In some embodiments, a given zone may be provided with a different substance or combination of substances, than another zone. This may be accomplished by e.g. providing a plurality of parallel extending main distribution pipes each offering downstream flow of a different substance or substance combination. The control heads in an exemplary embodiment; may according to an irrigation schedule monitoring, commanding and/or incorporated in the control heads—choose from which distribution pipe or pipes to gather irrigation substances for providing same downstream to distinct zones via control ports of the heads.

An irrigation cycle comprises a period of active irrigation during which e.g. an algorithm can control the irrigation system to provide irrigation substances to the field responsive to e.g. indexes such as NDVI, CWSI, or the like; derived from spatial information gathered from sensors for determining the spatial variability of vegetation or plant water content in the field.

In an embodiment, each irrigation strip comprises irrigation pipes and all pipes extend only along the columns of the field strips. Thus, in accordance with this embodiment, no pipings extend transverse to the column direction within the field crossing cultivated land of the field and by that entering of the field for installations and/or maintenance of such pipings may be avoided.

Typically pipings extending across the field in a direction transverse to columns of crops being grown are used for distributing irrigation substances to further pipes laid in the field extending along the columns of crops being grown. Distributing pipings typically include devices such as valves and control heads for the delivery of irrigation substances downstream to the crops. Such devices require maintenance and by avoiding placing such devices within the field ease of maintenance of such embodiment of irrigation system can be achieved.

In an aspect of the invention there is also provided a method of irrigating comprising the steps of: dividing a field into zones, providing an irrigation system comprising irrigation strips extending along columns of zones, starting to irrigate irrigation substances via the irrigation strips to at least some of the zones during an irrigation cycle when irrigation can be provided to the field, and irrigating a first one of the zones for a duration of time that is different from a duration of time that a second one of the zones is irrigated.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIGS. 5 to 9 are schematic cross sections of the irrigation strip of FIG. 4 taken, respectively, along planes V to IX in FIG. 4;

FIG. 10 is a section of the area marked X in FIG. 4; and

Figure 1:
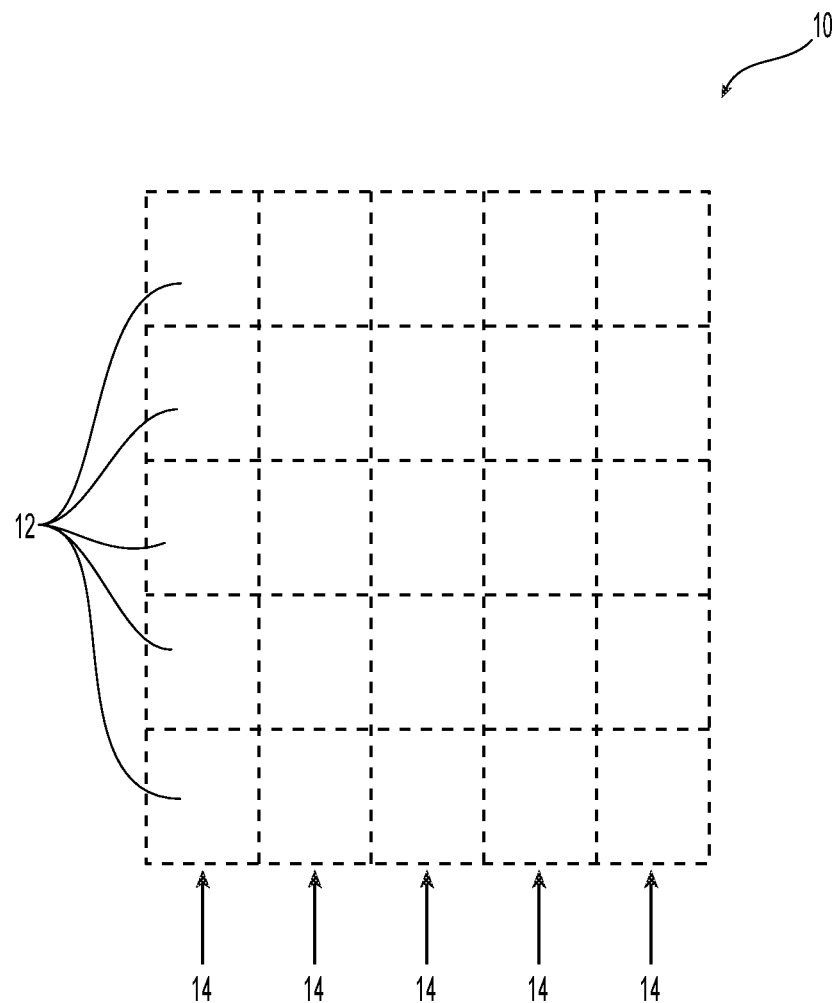
FIG. 1 schematically shows a field divided into zones according to various embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 showing a field 10 in which precision agriculture and/or irrigation is intended to be used. In an exemplary embodiment, field 10 may be divided into zones 12, here an optional matrix or array of 'five' by 'five' zones 12. In embodiments of the invention, any array size may be possible, with the number of rows not necessarily corresponding in number to the number of columns and not all columns or rows having equal number of zones (see for example FIG. 11 where the two right columns are longer and thus have shorter rows at their lower ends). Field 10 may be defined as including field-strips 14 including each several zones 12, in this example, 'five' zones. The strips 14 may extend one alongside the other in the row direction. And each column may comprise a plurality of zones extending end-to-end in the column direction of the field, along the length the column.

The size of a zone 12 may define a minimal resolution/area to which irrigation may be provided in field 10. Such size or resolution may be the result of consideration, such as, the type of crops being grown in field 10, the variability in the soil in the field, the topography of the field (etc.). The smallest possible zone size, in certain embodiments, may be the result of the data or information used for precision agriculture in field 10. Such data may be based in some embodiments, inter alia, on information from sensors monitoring the field.

Sensors used for deriving data in precision agriculture, in accordance with some embodiments of the invention, may include airborne sensors mounted on crafts, such as: satellites, airplanes, unmanned aerial vehicles (drones), hot-air balloons (and the like), Ground sensors may also be used, such as a vehicle mounted sensors (e.g. on tractors) and/or ground or plant zone specific stationary sensors; for monitoring crops from a proximal distance. Sensors mounted on poles, masts or towers for monitoring crops in a field from above may also be used for deriving the data for the precision agriculture.

Pixel resolution of an imaging device monitoring a field, may define a minimum size area covered in a field. Consequently the smallest size zone 12 may be defined by the area that such pixel covers in a field. In fields monitored by other techniques, such as by vehicle mounted sensors, larger flexibility may be available for defining such zone size. In certain embodiments, zone 12 may also be defined by a cluster of areas each covered by a single (or plurality) of pixels. In some embodiments sub-pixel resolution may also be used to define a minimal area monitored in a field, by taking for example an area monitored/viewed by a single pixel and dividing it into several zones. Zone size may thus at least in certain embodiments of the invention be determined by the actual field spatial variability to which preferably a dedicated irrigation schedule distinct from other field areas (zones), would be beneficial for enhancing e.g. crop yield in the field. Thus such zone size (possible smaller than pixel resolution) would in this case be defined not by the pixel resolution of the imaging device or at least wouldn't be constrained by such resolution.

Figure 2:
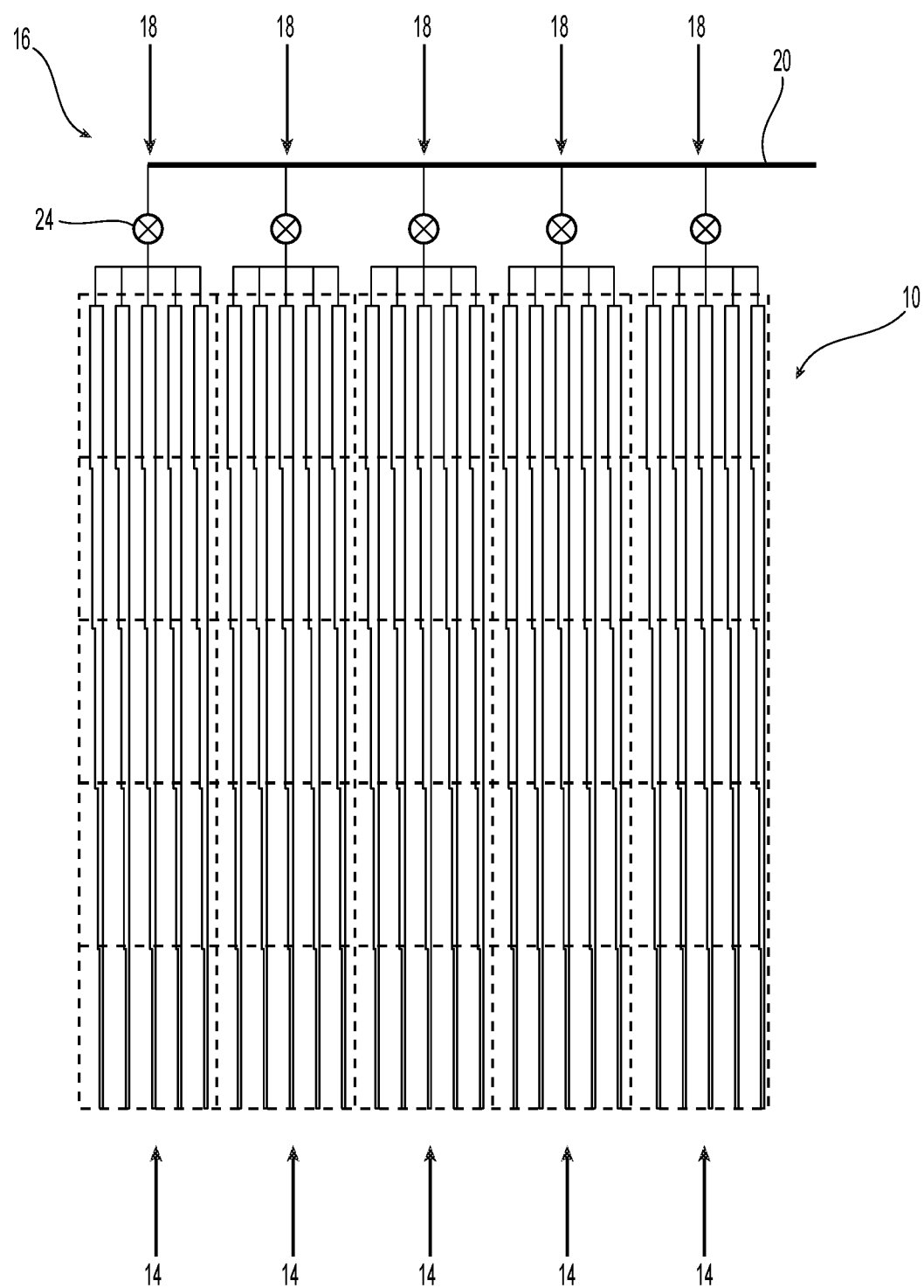
FIG. 2 schematically shows an embodiment of an irrigation system for irrigating the field of FIG. 1, including irrigation strips overlying strips of zones.

Attention is drawn to FIG. 2 illustrating an embodiment of an irrigation system 16 installed for irrigating field 10. Irrigation system 16 includes irrigation strips 18 each configured to irrigate a respective strip 14 of field 10 that extend in the column direction of the field. A main distribution pipe 20 of system 16 configured to provide irrigation fluids/liquids and/or substances to the irrigation strips 18 of system 16, extends laterally along a row direction of the field.

Figure 3:
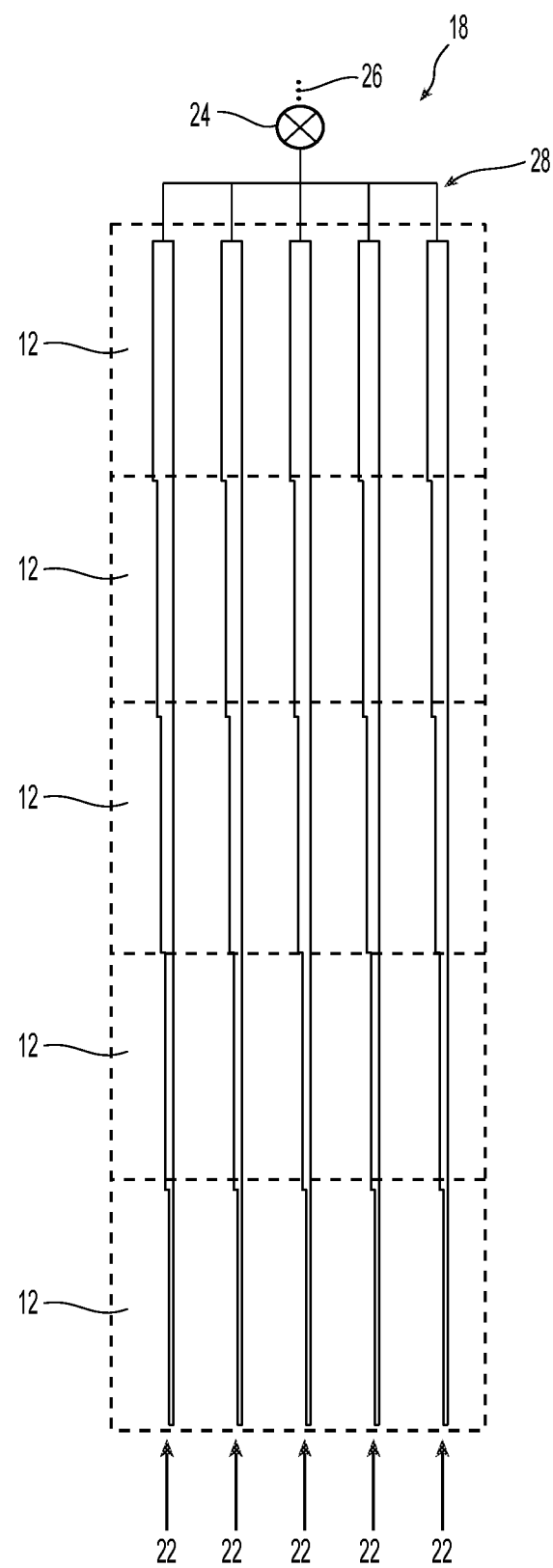
FIG. 3 schematically shows an embodiment of an irrigation strip overlying a strip of zones.

With attention drawn to FIG. 3 a more detailed view of an embodiment of an irrigation strip 18 is schematically shown. Irrigation strip 18 includes several supply lines 22 extending along the zones 12 of a given field strip 14 in the column direction for providing irrigation substances to crop/vegetation (not shown) that are grown in the field strips or intended to be grown there. Each irrigation strip 18 includes in addition an irrigation control head 24 and a feed pipe 26 for feeding fluid downstream into head 24 from distribution pipe 20. Control head 24 is in fluid communication with each supply line 22 via a pipe network 28 that will be discussed with reference to FIG. 4. As an example, a device that may be used as or in association with control head 24 may be one of the NMC family of Netafim Ltd.

Figure 4:
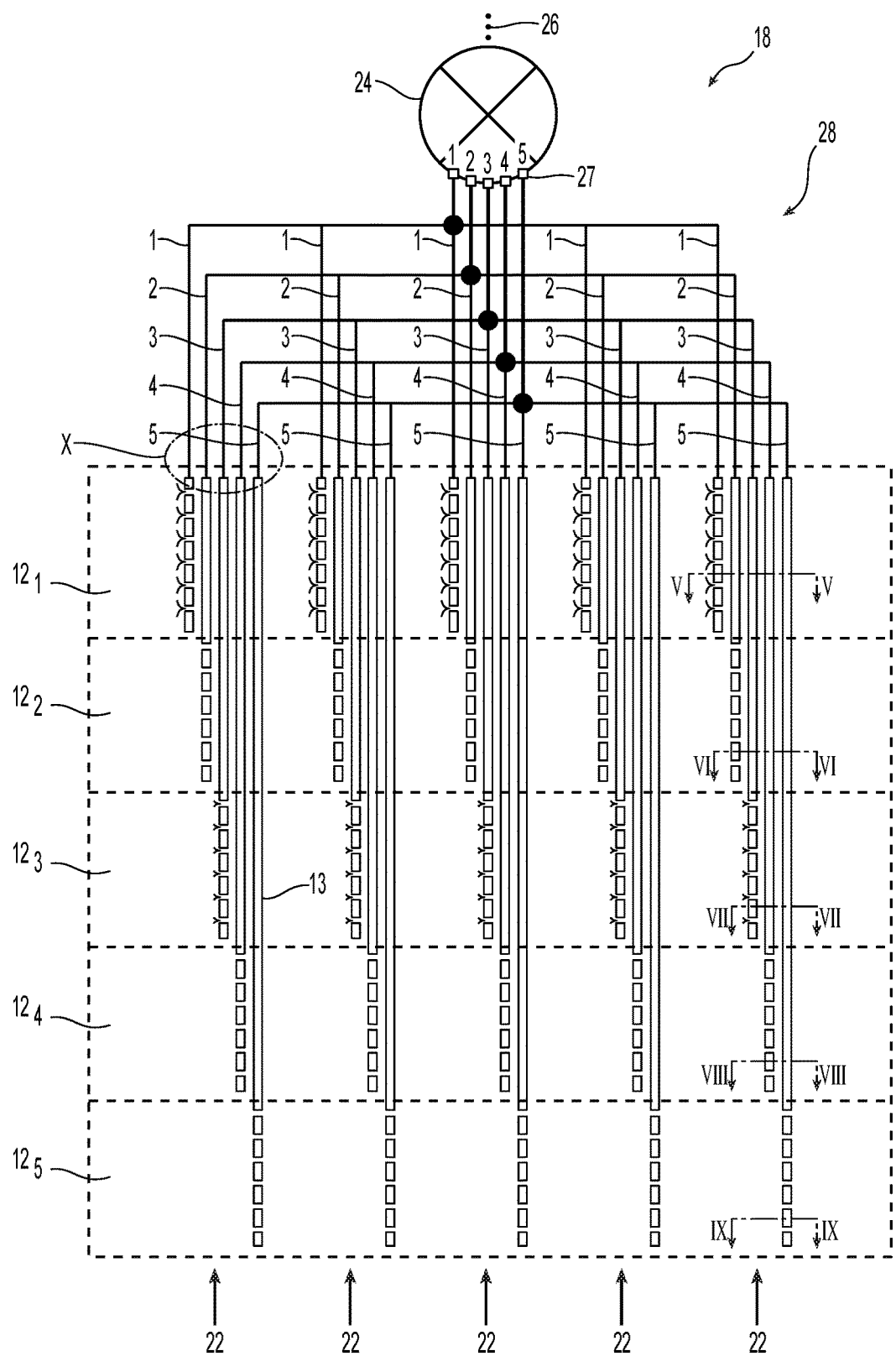
FIG. 4 schematically shows a more detailed view of an embodiment of FIG. 3.

FIG. 4 schematically shows a more detailed view of an embodiment of an irrigation strip 18 in system 16 and the zones 12 of a field strip 14 irrigated by the irrigation strip 18. The zones 12 have been tagged "1" to "5" according to order of location with respect to the upstream end of irrigation strip 18. As seen in this figures, the zones 12$_1$, 12$_2$, etc., corresponding to the irrigation strip 18 extend end-to-end in the column direction of the field, along a length of the irrigation strip 18.

Each supply line 22 of strip 18 is here seen including a plurality of pipes 13. Here, the pipes 13 included in each supply line 22 correspond in number to the number of zones 12 of field strip 14 along which the supply line 22 extends. Since in this example the number of zones 12 in the viewed field strip 14 is 'five', the number of pipes 13 in each supply line 22 irrigating the strip may correspondingly be also 'five', with each pipe 13 being tagged respectively by the digit '1' to '5' (digits indicated at the top of each supply line).

Control head 24 is here seen including control ports 27 (only one marked by a numeral 27) that correspond in number to the number of supply lines 22 in irrigation strip 18. In this example, the number of control ports 27 is 'five', with each port 27 being tagged by a respective digit ranging from '1' to '5'. In the embodiment of the irrigation strip 18 seen in FIG. 4, each port 27 communicates via network 28 with a respective pipe 13 bearing the same digit ('1' to '5') in each one of the irrigation lines 22. In other words, e.g., port 27 tagged '1' communicates via network 28 with all of the pipes 13 tagged '1' in the supply lines 22 of strip 18; port 27 tagged '2' communicates via network 28 with all of the pipes 13 tagged '2' in the supply lines 22 of strip 18; (and so on). Thus, each irrigation strip 18 comprises a plurality of irrigation pipes extending into all zones of a column. And the control head 24 is configured to control flow into the plurality of pipes 13 such that all pipes 13 arranged to irrigate a given zone of the irrigation strip, are required to simultaneously supply irrigation substances to that zone, rather than in an independent manner in relation to one another.

The pipes 13 of the supply lines 22 as seen in FIG. 4 may in an embodiment have each a different axial extension along irrigation strip 18. The pipes tagged '1' for example are seen extending along one single zone 12 (the one tagged 12$_1$), those tagged '2' along two consecutive zones 12, and so on until, those tagged '5' that extend over all the zones 12 of the strip, here 'five' zones.

Each pipe as seen in FIG. 4 is also illustrated having a 'solid' segment and/or a 'dotted' segment. Each pipe tagged '1', for example, has only a 'dotted' segment and e.g. each pipe tagged '5' has a long 'solid' segment ending with a 'dotted' segment. In an embodiment of the invention, each 'dotted' segment represents a pipe segment adapted to emit irrigation (e.g. fluids, liquids and/or solutions) and each 'solid' segment a pipe segment that may only transfer irrigation downstream without emitting any irrigation. In an embodiment of the invention each 'dotted' segment may be a drip irrigation pipe segment configured to emit irrigation within the zone 12 along which it extends. In other embodiments, the dotted segment may be a pipe segment associated with mini-sprinkler or any other suitable irrigation device for emitting irrigation.

Consequently, control head 24 can control provision of irrigation via ports 27 to distinct zones 12 in strip 18. Port 27 tagged '1' can distribute irrigation via all the pipes tagged '1' to the first zone 12$_{\text{``1''}}$ of strip 18; Port 27 tagged '2' to the second zone 12$_{\text{``2''}}$ of strip 18; (etc.). In general form it thus may be defined that in each irrigation strip 18, control head 24 may distribute irrigation downstream via port 27 tagged "i" to a pipe tagged "i" in each supply line 22 in order to irrigate the "i-th" zone 12 (i.e. zone 12$_{\text{``i''}}$) of the strip 18. Accordingly, within a column of zones 12$_{\text{``i''}}$ served by a supply line 22, at least one zone configured to be provided with irrigation substances is downstream, in the column direction, from at least one other zone also configured to be provided with irrigation substances.

In the illustrated example seen in FIG. 4, irrigation is shown being provided during an irrigation cycle to zone 12$_1$ for a first duration of time and to zone $12_3$ for a second exemplary shorter duration of time, while zones $12_2$, $12_4$ and $12_5$ are not being irrigated in this example. Since irrigation of each zone 12 may be independently controlled, each zone 12 may be provided with a distinct irrigation scheme, such as duration of time during an irrigation cycle where irrigation is to be provided to the zone. However, as seen in both FIGS. 3 and 4, each supply line 22 and strip 18 is devoid of valves located within the zones 12 of the field strips, irrigation control being provided by the control head 24.

With attention drawn to FIGS. 5 to 9, an embodiment of an irrigation system 16 may be seen including possibly smaller sized (e.g. diameter) non-emitting pipes for leading irrigation downstream while possibly having larger sized pipes for emitting irrigation. This may have an advantage of saving on piping material and/or compactness of the supply lines 22 in the irrigation system. In a non-binding example, the diameter of the non-emitting pipes may be 8 mm while the diameter of the emitting pipes may be 12 mm.

With attention drawn back to FIG. 2 one of the advantages of the shown embodiment of system 16 may be appreciated as centrality locating all control heads 24 of the system 16 at one single side of field 10. This may assist in simplifying installation of system 16 as well as maintenance and setup of the system.

Figure 11:
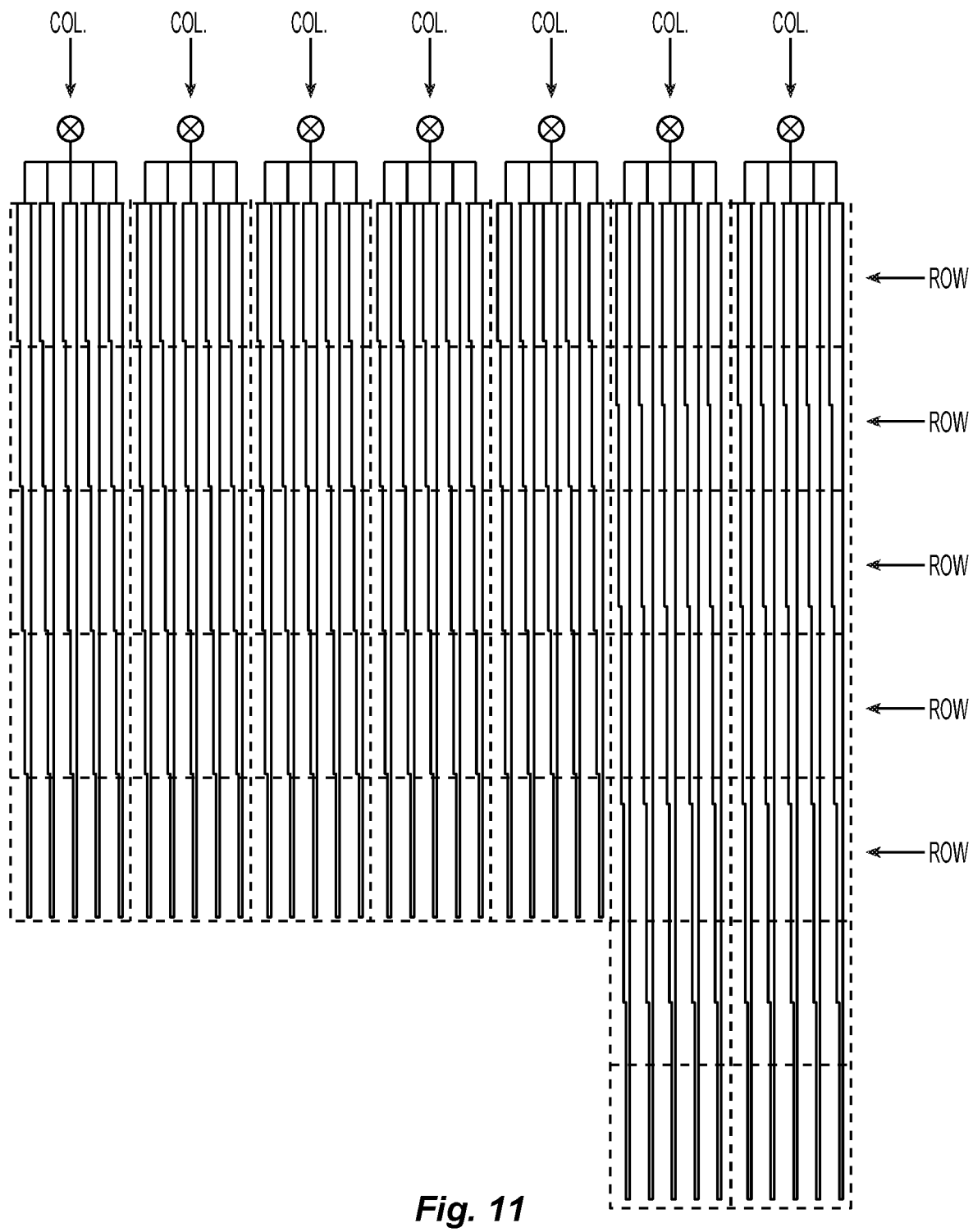
FIG. 11 schematically shows an irrigation system for irrigating a field divided into zones according to an embodiment of the present invention.

With attention drawn to FIG. 11 the location, inter alia, of the control heads in an irrigation system according to an embodiment of the invention is further illustrated. In this embodiment, the field is divided into zones covering cultivated areas where crops and/or vegetation are grown or are intended to be grown. Here the columns of the two field strips at the right hand side of the field are longer to cover cultivated land belonging to the field that extends further in this area. At least part of the zones of the field can be seen forming a matrix that includes rows and columns of zones.

In this example, the control heads of the irrigation system can be seen extending alongside the upper row at the boundary of the matrix and the field. Possibly, the control heads and the pipe network leading irrigation substances from each respective head to its irrigation strip are located beyond the boundary of the matrix and field.

With respect to this embodiment it can also be seen that all irrigation-strips/supply-lines/irrigation-pipes extend only in the column direction along the field strips and are "fed" downstream with irrigation substances from an infrastructure located outside of the zones, matrix and/or field that extends transverse to the column direction (i.e. the row direction). Such infrastructure that typically requires access for e.g. maintenance may include the main distribution pipe, control heads and pipe networks, and may be easily accessed without passing though the zones of the field.

To further assist in ease of maintenance and setup of system 16 attention is drawn to an embodiment seen in FIG. 10. In an embodiment, an indicator 17 may be provided to each given pipe 13 in supply line 22 and to each respective pipe in network 8 to which the given pipe 13 is planned to connect in system 16. In FIG. 10 this is illustrated by the corresponding shapes marked at the ends of pipes which are adapted to connect. Indicator 17 may have various forms and shapes to assist in ease and correct installment of system 16 in a field 10. For example, indicators 17 may be in the form of colors assigned to corresponding pipes or pipe sections, possible ends of pipes. Indicator 17 may also be in the form of unique shapes assigned to pipes adapted to connect in system 16. Indicator 17 may also be over molded onto the pipes (etc).

In embodiments of the invention, provision of irrigation to an agricultural field such as field 10 by an irrigation system, such as system 16, may be controlled by an algorithm according to indexes derived from information gathered for precision agriculture or irrigation. In a non-binding example, such indexes may include stress indexes such as Crop Water Stress Index (CWSI) derived from sensors obtaining temperature measurements of crops. Other indexes may include soil and vegetation indexes, such as Normalized Difference Vegetative Index (NDVI) derived e.g. from high spectral imagery and based on optical reflectivity of plants. An irrigation cycle may be defined as a duration of time during which irrigation can be possible to field 10, by for example main distribution pipe 20 actively communicating irrigation downstream from an upstream fluid source (not seen). Thus the irrigation cycle comprises a period of active irrigation during which the algorithm can control the irrigation system to provide irrigation to the field responsive to the indexes (e.g. NDVI, CWSI, or the like).

For each irrigation strip 18 of system 16, the algorithm may receive, communicate or determine the duration of time $T_{"i"}$ that its control head 24 may open port 27 tagged "i" during an irrigation cycle. If a certain $T_{"i"}$ is zero then the port 27 tagged "i" may not open during the given irrigation cycle. At an end of the irrigation cycle the irrigation to the field may terminate and possibly reopen on commencement of a new cycle where new duration of times $T_{"i"}$ for the opening of ports 27 in system 16 are provided to the algorithm Such cycles may start on a diurnal basis or any other required frequency.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. An irrigation system for irrigating a field divided into zones, the zones being arranged in columns extending alongside each other, each column defining a field strip and comprising a plurality of zones which extend end-to-end in a column direction of the field, along a length of said each column, and the system comprising:
   a plurality of irrigation strips, each irrigation strip providing irrigation substances to a respective field strip, each irrigation strip comprising irrigation pipes and all of said irrigation pipes extend only along the columns of the field strips; and
   a control head at one end of each irrigation strip, each control head controlling flow towards said each irrigation strip, wherein:
   at least some of the zones define a matrix comprising rows and columns of zones;
   each zone within a given column is provided with irrigation substances in an independent manner in relation to other zones within that column;
   within said given column, at least one zone configured to be provided with irrigation substances is downstream, in said column direction, of at least one other zone also configured to be provided with irrigation substances; and
   all of the control heads are located outside of the matrix.

2. The irrigation system of claim 1, wherein the independent manner comprises irrigating different zones for different durations of time during an irrigation cycle when the irrigation substances can be provided via the system to the field.

3. The irrigation system of claim 1, wherein the irrigation strips extend only along the columns of the field strips.

4. The irrigation system of claim 1, wherein each zone is configured to receive irrigation substances from several irrigation pipes of a given irrigation strip.

5. The irrigation system of claim 1, wherein said each irrigation strip is devoid of both control heads and control ports located within the zones belonging to the column defining the field strip which said each irrigation strip is configured to irrigate.

6. The irrigation system of claim 1, wherein:
   each control head comprises a plurality of control ports, and each control port controls flow to a different zone within said given column.

7. An irrigation system for irrigating a field divided into zones, the zones being arranged in columns extending alongside each other, each column defining a field strip and comprising a plurality of zones which extend end-to-end in a column direction of the field, along a length of said each column, and the system comprising:
   a plurality of irrigation strips, each irrigation strip configured to irrigate a respective one of the field strips; and
   a control head at one end of each irrigation strip, the control head configured to control flow towards said each irrigation strip, such that irrigation substances are supplied to zones in a given column in an independent manner in relation to other zones within said given column;
   wherein:
   each irrigation strip comprises a plurality of supply lines extending along the field strip being irrigated by said each irrigation strip; and
   within said given column, at least one zone configured to be supplied with irrigation substances is downstream, in said column direction, of at least one other zone also configured to be supplied irrigation substances.

8. The irrigation system of claim 7, wherein the field comprises a perimeter bounding the zones, and the perimeter comprises at least one lateral side along which all the control heads are placed.

9. The irrigation system of claim 8, wherein at least some of the zones define a matrix comprising rows and columns of zones, and a lateral side of the perimeter is at a boundary of the matrix alongside a row.

10. The irrigation system of claim 7, wherein each irrigation strip is configured to irrigate each zone in an independent manner from the other zones of the field strip being irrigated by said each irrigation strip.

11. The irrigation system of claim 10, wherein each supply line comprises at least two irrigation pipes extending at least in part alongside each other.

12. The irrigation system of claim 11, wherein each irrigation pipe is adapted to provide irrigation to only one zone.

13. The irrigation system of claim 12, wherein each irrigation pipe does not extend downstream beyond the zone irrigated by said each irrigation pipe.

14. The irrigation system of claim 10, wherein the independent manner comprises irrigating for different durations of time during an irrigation cycle when irrigation can be provided via the system to the field.

15. The irrigation system of claim 11, wherein each zone in the field strip being irrigated by said each irrigation strip is configured to receive irrigation from a pipe belonging to each one of the supply lines of the irrigation strip irrigating the field strip.

16. The irrigation system of claim 7, wherein said each irrigation strip is devoid of both control heads and control ports located within the zones belonging to the column defining the field strip which said each irrigation strip is configured to irrigate.

17. The irrigation system of claim 7, wherein:
   each control head comprises a plurality of control ports, and each control port controls flow to a different zone within said given column.

18. The irrigation system according to claim 7, wherein:
   each irrigation strip comprises a plurality of irrigation pipes extending into all zones of a column; and
   the control head is configured to control flow into said plurality of irrigation pipes such that all irrigation pipes arranged to irrigate a given zone with said each irrigation strip, are required to simultaneously supply irrigation substances to said given zone, rather than in an independent manner in relation to one another.

19. An irrigation system for irrigating a field divided into zones arranged in columns, each column comprising a plurality of zones which extend end-to-end in a column direction of the field, along a length of said each column, the system comprising:
   an irrigation supply line extending along at least two zones located within the same column, wherein:
   the system is adapted to irrigate, with the supply line, one of the at least two zones independently from another of the at least two zones;
   said one of the at least two zones is downstream, in said column direction, from said another of the at least two zones;
   the irrigation supply line comprises a plurality of pipes, each pipe terminating in a different zone within the same column; and the irrigation supply line is devoid of both control heads and control ports located within the at least two zones.

20. An irrigation system for irrigating a field divided into zones, the zones being arranged in columns extending alongside each other, each column defining a field strip and comprising a plurality of zones which extend end-to-end in a column direction of the field, along a length of said each column, and the system comprising:
   a plurality of irrigation strips, each irrigation strip providing irrigation substances to a respective field strip; and
   a control head at one end of each irrigation strip, each control head controlling flow towards said each irrigation strip;
   wherein:
   at least some of the zones define a matrix comprising rows and columns of zones;
   each zone within a given column is provided with irrigation substances in an independent manner in relation to other zones within that column;
   within said given column, at least one zone configured to be provided with irrigation substances is downstream, in said column direction, of at least one other zone also configured to be provided with irrigation substances;
   all of the control heads are located outside of the matrix;
   each irrigation strip comprises irrigation pipes; and
   within the matrix, all irrigation pipes extend only in a column direction along the field strips and are fed with the irrigation substances from an infrastructure located outside of the zones, thereby allowing access to the control heads, without requiring maintenance personnel to pass though the zones located within the matrix.

21. An irrigation system for irrigating a field divided into zones, the zones being arranged in columns extending alongside each other, each column defining a field strip and comprising a plurality of zones which extend end-to-end in a column direction of the field, along a length of said each column, the system comprising:
   a plurality of irrigation strips, each irrigation strip providing irrigation substances to a respective field strip, each irrigation strip comprising:
      a pipe network for supplying fluid from a feed pipe to a plurality of supply lines, each supply line extending into a plurality of zones with at least one of said plurality zones being downstream, in said column direction, from another of said plurality of zones, each supply line comprising a plurality of pipes, each pipe terminating in a different one of the zones belonging to a column of zones associated with said each irrigation strip; and
      a control head at one end of the irrigation strip, the control head comprising a plurality of control ports, each control port configured to control irrigation in exactly one of the zones belonging to said column; wherein:
   each zone within said column is provided with irrigation substances in an independent manner in relation to other zones within said column.

22. The irrigation system according to claim 21, wherein:
   at least some of the zones define a matrix comprising rows and columns of zones; and
   all of the control heads and control ports are located outside of the matrix of zones.

23. The irrigation system of claim 21, wherein each control port is configured to control irrigation substances supplied to all pipes terminating in the same zone of said column.

24. The irrigation system of claim 21, wherein said each irrigation strip is devoid of both control heads and control ports located within the zones belonging to said column of zones associated with said irrigation strip.

25. The irrigation system according to claim 21, wherein:
   the control head is configured to control flow into said plurality of pipes such that all pipes arranged to irrigate a given zone with said each irrigation strip, are required to simultaneously supply irrigation substances to said given zone, rather than in an independent manner in relation to one another.

26. An irrigation system for irrigating a field divided into zones, the zones being arranged in columns extending alongside each other, each column defining a field strip and comprising a plurality of zones which extend end-to-end in a column direction of the field, along a length of said each column, and the system comprising:
   a plurality of irrigation strips, each irrigation strip providing irrigation substances to a respective field strip; and
   a control head at one end of each irrigation strip, each control head controlling flow towards said each irrigation strip;
   wherein:
   at least some of the zones define a matrix comprising rows and columns of zones;
   each zone within a given column is provided with irrigation substances in an independent manner in relation to other zones within that column;
   within said given column, at least one zone configured to be provided with irrigation substances is downstream, in said column direction, of at least one other zone also configured to be provided with irrigation substances;
   all of the control heads are located outside of the matrix;
   each irrigation strip comprises a plurality of irrigation pipes extending into all zones of a column; and
   the control head is configured to control flow into said plurality of irrigation pipes such that all irrigation pipes arranged to irrigate a given zone with said each irrigation strip, are required to simultaneously supply irrigation substances to said given zone, rather than in an independent manner in relation to one another.

* * * * *